March 8, 1949.  H. P. PHILLIPS  2,463,802
NARROW STEEL SPACER
Filed Sept. 25, 1947

INVENTOR.
Harold P. Phillips
BY
Attorney.

Patented Mar. 8, 1949

2,463,802

UNITED STATES PATENT OFFICE 2,463,802

NARROW STEEL SPACER

Harold P. Phillips, Hastings, Mich., assignor to Hastings Manufacturing Company, Hastings, Mich.

Application September 25, 1947, Serial No. 776,073

8 Claims. (Cl. 309—44)

This invention relates to improvements in piston ring elements.

The main objects of the invention are:

First, to provide a piston ring element formed entirely of ductile metal which can be readily and economically fabricated and is not likely to be broken or distorted in use.

Second, to provide a piston ring element having these advantages with the advantage of very free drainage thereby adapting it for use as an oil ring.

Third, to provide a piston ring element of the type above described having oil drainage reaches and spacer reaches, the drainage reaches being of substantially solid cross section and the spacer reaches being conformed to resist crushing or collapse and being hollow to provide oil pockets or reservoirs adapted to permit seepage of oil into and from the same.

Fourth, to provide a piston ring element formed of ductile metal which may be used as a spacer element in combination with flat elements formed of ribbon steel.

Objects relating to the details and economies of the invention will appear from the detailed description to follow. The invention is defined and pointed out in the claims.

A preferred embodiment of the invention is illustrated in the accompanying drawing, in which.

Figure 1:
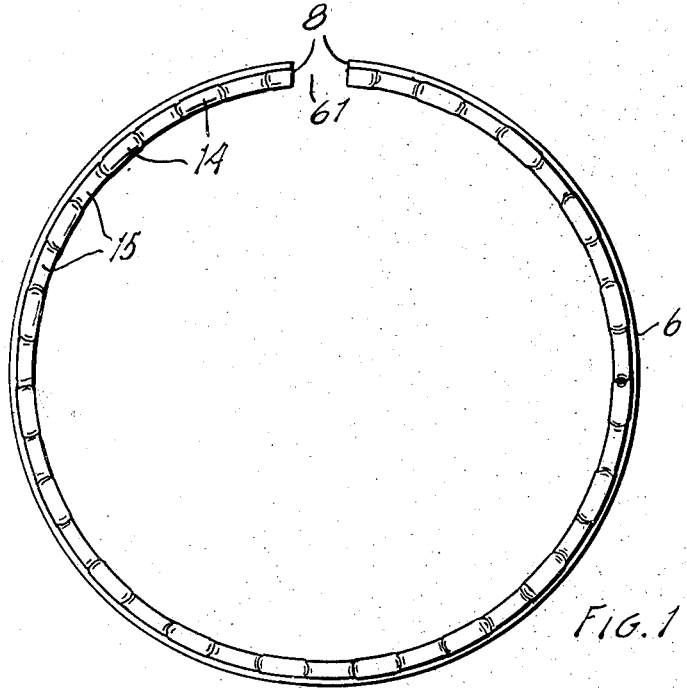
Fig. 1 is a plan view of the ring element, showing the spacer and oil drainage reaches on one side of the element.
Figure 2:
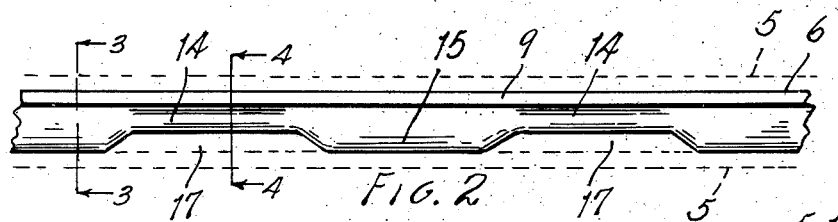
Fig. 2 is an enlarged fragmentary view of the ring element, the view having the outer peripheral edge of the element, the view also showing in dotted outline the upper and lower co-operating flat ring cylinder wall engaging members.
Figures 3, 4:
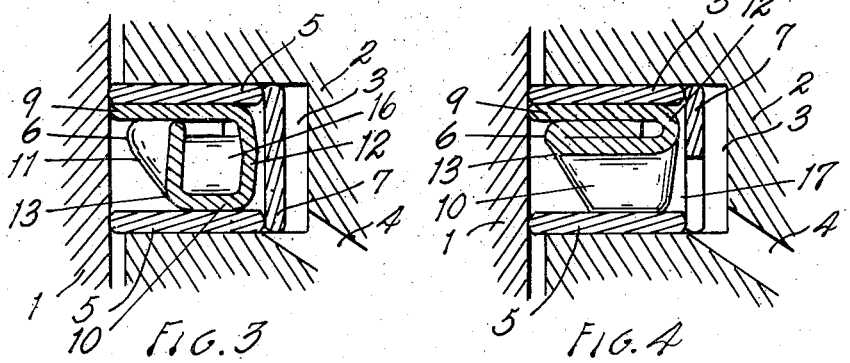

Figs. 3 and 4 are enlarged fragmentary vertical sectional views of the piston ring assembly in relation to the piston and cylinder, the views showing the improved piston ring element on the lines 3—3 and 4—4, respectively of Fig. 2.

In considering the accompanying drawings it should be borne in mind that no attempt is made to show the parts in their relative proportion and where associated with the piston and cylinder to show the clearances and relative proportions.

In the drawings 1 represents the cylinder and 2 a piston having a piston ring groove 3 therein provided with oil drainage passages 4. The ring assembly disposed in the ring groove 3 comprises the spaced split expansible annularly-shaped cylinder wall engaging members 5, the intermediate spacer element 6 and the expander 7 yieldably forcing the side members 5 and spacer element 6 into engagement with the cylinder wall.

The spacer ring element designated generally by the numeral 6 relates to the type of ring element disclosed in my Patent No. 2,404,862 granted July 30, 1946, wherein a flat strip or ribbon of relatively thin ductile steel or other metal is folded longitudinally upon itself by any suitable means as folding rollers and thereafter conformed to desired shape by suitable die members.

The spacer ring element 6 is annularly shaped, resilient and split at 61 providing spaced ends 8 permitting the ring element to be compressed into the ring groove 3 and to expansibly engage the cylinder wall 1. The spacer element comprises the upper, lower and intermediate plies or members 9, 10 and 11, respectively, the upper ply 9 being connected to the lower ply 10 by the intermediate inner or rear wall portion 12, and lower ply 10 being connected to the intermediate ply 11 by the bight or intermediate bent portion 13. The upper ply 9 is of greater radial width than the lower ply 10 and constitutes a cylinder wall engaging element and a means for engagingly supporting the upper flat annular cylinder wall engaging side member 5.

The ring element 6 is provided with alternate drain reaches 14 and spacer reaches 15. In the drain reaches the plies 9, 10 and 11 are disposed in parallel side by side contacting relation as shown in Fig. 4, whereas in the spacer reaches the intermediate ply 11 is disposed at substantially right angles to and supportingly spaces the upper and lower plies 9 and 10 and is disposed in spaced relation to the rear wall 12 as shown in Fig. 3, thereby rigidly supporting the upper and lower plies in spaced relation and providing a hollow section constituting an oil pocket or reservoir 16. While the free edge of the intermediate ply is disposed to supportingly engage the upper ply it is not soldered or welded to said ply, thereby permitting seepage of the oil to and from the oil pockets or reservoirs 16. These pockets receive oil by seepage from the cylinder wall after starting and thereafter deliver this oil to the cylinder wall upon a subsequent first starting.

The plies in the drain reaches 14 are axially collapsed or upset into parallel, abutting relation by any suitable die member. This operation is similar to the formation of the oil drainage reaches disclosed in my patent previously mentioned.

My ring element embodying the construction above described in which the intermediate ply 11 is parallel to the upper and lower plies in the drainage reaches and at right angles to said plies in the spacer reaches is well adapted to the formation of spacer ring elements which are axially either very narrow or of a considerable width, it being only necessary to vary the vertical dimension of the intermediate ply 11 in the spacer reaches in order to vary the axial width of the ring element. My ring element is also well adapted for free drainage of oil therethrough, as there are relatively few plies in the drainage reaches all of which plies are upset into parallel contacting relation thereby providing oil drain passageways 17 of substantial axial width to facilitate free drainage of oil therethrough.

While I have shown and described the ring element 6 as a spacer between the flat cylinder wall engaging members 5, this ring element is well adapted for use in other piston ring assemblies than that herein disclosed, as for example in such assemblies as are shown in my patent hereinbefore mentioned.

I have illustrated and described a very practical embodiment of my invention. I have not attempted to illustrate or describe other embodiments or adaptations as it is believed this disclosure will enable those skilled in the art to embody or adapt my invention as may be desired.

Having thus described my invention what I claim as new and desire to secure by Letter Patent is:

1. A piston ring assembly comprising a pair of axially spaced split expansible cylinder wall engaging side members, a split annular expansible ring element intermediate said cylinder wall engaging side members, formed of a ribbon of ductile metal conformed to provide oppositely disposed outer plies, an inner wall connecting the inner edges of said outer plies and a ply intermediate said outer plies, one of said outer plies being flat and constituting a cylinder wall engaging member, the other outer ply being integrally connected at its outer edge to one edge of said intermediate ply, the other edge of said intermediate ply being free, said several plies extending continuously from end to end of the ring element and being conformed to provide alternate oil drainage reaches and spacer reaches, the intermediate ply in the oil drainage reaches being disposed in parallel engaging relation to the outer plies, the intermediate ply in the spacer reaches being disposed at substantially right angles to the outer plies and supportingly spacing said outer plies and having its free edge supportingly engaging the flat outer ply constituting the cylinder wall engaging member, and being spaced from said inner wall to provide oil receiving cavities in the spacer reaches adapted to permit seepage of oil into and from the same.

2. A piston ring assembly comprising a pair of axially spaced split expansible cylinder wall engaging side members, a split annular expansible ring element intermediate said cylinder wall engaging side members, formed of a ribbon of ductile metal conformed to provide oppositely disposed outer plies, an inner wall connecting the inner edges of said outer plies and a ply intermediate said outer plies, one of said outer plies being flat, the other outer ply being integrally connected at its outer edge to one edge of said intermediate ply, the other edge of said intermediate ply being free, said several plies extending continuously from end to end of the ring element and being conformed to provide alternate oil drainage reaches and spacer reaches, the intermediate ply in the oil drainage reaches being disposed in parallel engaging relation to the outer plies, the intermediate ply in the spacer reaches being disposed at substantially right angles to the outer plies and supportingly spacing said outer plies and having its free edge supportingly engaging said flat outer ply, and being spaced from said inner wall to provide oil receiving cavities in the spacer reaches adapted to permit seepage of oil into and from the same.

3. A piston ring assembly comprising a pair of axially spaced split expansible cylinder wall engaging side members, a split annular expansible ring element intermediate said cylinder wall engaging side members, formed of a ribbon of ductile metal conformed to provide oppositely disposed outer plies, an inner wall connecting the inner edges of said outer plies and a ply intermediate said outer plies, one of said outer plies being flat, the other outer ply being integrally connected at its outer edge to one edge of said intermediate ply, the other edge of said intermediate ply being free, said several plies extending continuously from end to end of the ring element and being conformed to provide alternate oil drainage reaches and spacer reaches, the intermediate ply in the oil drainage reaches being disposed in parallel engaging relation to the outer plies, the intermediate ply in the spacer reaches supportingly spacing said outer plies and having a free edge supportingly engaging said flat outer ply, and being spaced from said inner wall to provide oil receiving cavities in the spacer reaches adapted to permit seepage of oil into and from the same.

4. A split annular resilient piston ring element formed of a ribbon of ductile metal conformed to provide two oppositely disposed outer plies, an inner wall connecting said outer plies at the inner edges thereof, and a ply intermediate said outer plies, one of said outer plies being flat and constituting a cylinder wall engaging member, the other outer ply being integrally connected at its outer edge to one edge of said intermediate ply, the other edge of said intermediate ply being free, said several plies extending continuously from end to end of the ring element and being conformed to provide alternate oil drainage reaches and spacer reaches, the intermediate ply in the drainage reaches being disposed in parallel engaging relation to the outer plies, the intermediate ply in the spacer reaches being disposed at substantially right angles to the outer plies and with its free edge portion in supporting engagement with the first named flat outer ply, said intermediate ply in the spacer reaches being spaced from said rear wall to provide oil receiving cavities in the spacer reaches adapted to permit seepage of oil into and from the same.

5. A split annular resilient piston ring element formed of a ribbon of ductile metal conformed to provide two oppositely disposed outer plies, an inner wall connecting said outer plies at the inner edges thereof and a ply intermediate said outer plies, one of said outer plies being flat, the other ply being integrally connected at its outer edge to one edge of said intermediate ply, the other edge of said intermediate ply being free, said several plies extending continuously from end to end of the ring element and being conformed to provide alternate oil drainage reaches and spacer reaches, the intermediate ply in the drainage reaches being disposed in parallel engaging relation to the outer plies, the intermediate ply in the spacer reaches being disposed at substantially right angles to the outer plies and with its free edge portion in supporting engagement with the first named flat outer ply, said intermediate ply in the spacer reaches being spaced from said rear wall to provide oil receiving cavities in the spacer reaches adapted to permit seepage of oil into and from the same.

6. A split annular resilient piston ring element formed of a ribbon of ductile metal conformed to provide two oppositely disposed outer plies, an inner wall connecting said outer plies at the inner edges thereof, and a ply intermediate said outer plies, one of said outer plies being flat, the other outer ply being integrally connected at its outer edge to one edge of said intermediate ply, the other edge of said intermediate ply being free, said several plies being conformed to provide alternate oil drainage reaches and spacer reaches, the intermediate ply in the drainage reaches being disposed in parallel engaging relation to the outer plies, the intermediate ply in the spacer reaches being disposed at substantially right angles to the outer plies and with its free edge portion in supporting engagement with the first named flat outer ply, said intermediate ply in the spacer reaches being spaced from said rear wall to provide oil receiving cavities in the spacer reaches adapted to permit seepage of oil into and from the same.

7. A split annular expansible piston ring element formed of ductile metal conformed to provide generally parallel outer spaced plies, a ply intermediate said outer plies, and an inner wall connecting the inner edges of said outer plies, said intermediate ply being integrally connected at one edge to the outer edge of one of said outer plies, the other edge of said intermediate ply being free, said several plies being conformed to provide alternate oil drainage reaches and spacer reaches, the several plies extending continuously through said alternate reaches, said inner wall in the spacer reaches being disposed substantially at right angles to the outer plies and supportingly spacing the same, said intermediate ply in the drainage reaches being disposed parallel to and in engaging relation to the outer plies, said intermediate ply in the spacer reaches being disposed substantially at right angles to the outer plies and supportingly spacing the same and being disposed in spaced relation from said inner wall, said intermediate ply having its free edge portion in supporting engagement with the outer ply opposite from the outer ply to which it is integrally connected.

8. A split annular expansible piston ring element formed of ductile metal conformed to provide generally parallel outer spaced plies, a ply intermediate said outer plies and an inner wall connecting the inner edges of said outer plies said intermediate ply being integrally connected at one edge to the outer edge of one of said outer plies, the other edge of said intermediate ply being free, said several plies being conformed to provide alternate oil drainage reaches and spacer reaches, the several plies extending continuously through said alternate reaches, said inner wall in the spacer reaches supportingly spacing the same, said intermediate ply in the drainage reaches being disposed parallel to and in engaging relation to the outer plies, said intermediate ply in the spacer reaches supportingly spacing the same and being disposed in spaced relation from said inner wall, said intermediate ply having its free edge portion in supporting engagement with the outer ply opposite from the outer ply to which it is integrally connected.

HAROLD P. PHILLIPS.

REFERENCES CITED

The following references are of record in the file of this patent:

UNITED STATES PATENTS

| Number | Name | Date |
|---|---|---|
| 2,404,862 | Phillips | July 30, 1946 |